March 25, 1930.  J. J. WILT  1,751,847
RADIATOR GAUGE
Filed June 19, 1928
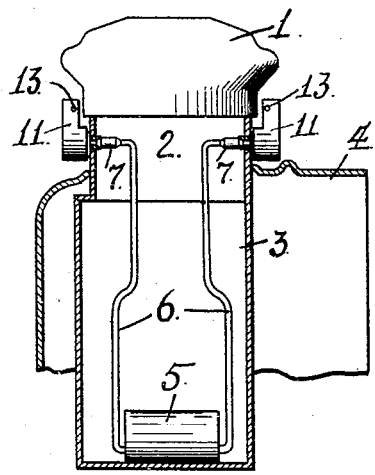
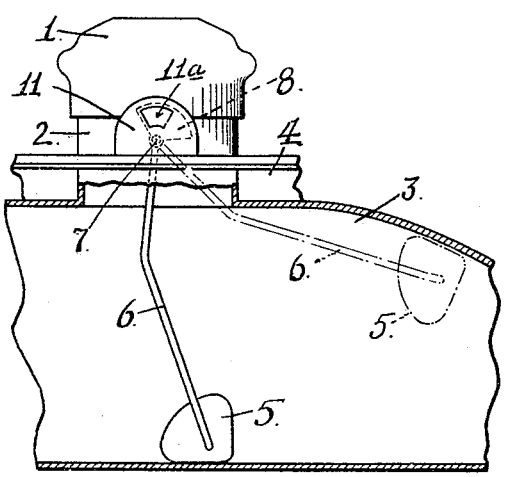
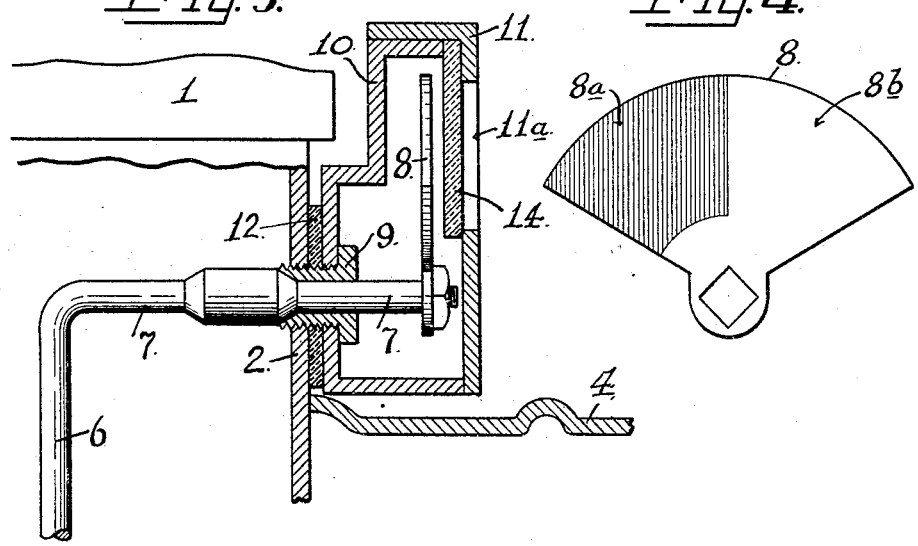
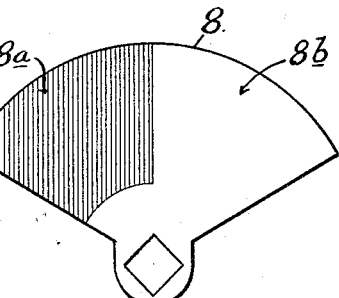
INVENTOR.
John J. Wilt
BY Booth & Booth
ATTORNEYS.

Patented Mar. 25, 1930

1,751,847

UNITED STATES PATENT OFFICE

JOHN J. WILT, OF BAKERSFIELD, CALIFORNIA

RADIATOR GAUGE

Application filed June 19, 1928. Serial No. 286,530.

My invention relates to that type of gauges for indicating fluid level, which comprises a float, functioning as the prime mover; an indicator; and motion transmitting means between the float and indicator.

The object of my invention is to provide a simple, effective and easily installed device of this nature, primarily intended as a water-gauge for radiators of water-cooled internal combustion engines.

To this end my invention consists in the novel construction, arrangement and combination of parts providing for their simple and effective assemblage, and for their mounting in situ.

In the accompanying drawings, I have illustrated my device in its preferred form, it being understood that changes may be made without departing from the spirit of the invention as defined by the claim hereunto appended.

Fig. 1 is an elevation of the gauge showing its application to the radiator.

Fig. 2 is an elevation of the same, taken at right angles to Fig. 1,

Fig. 3 is a sectional view, enlarged, of the indicator housing.

Fig. 4 is an elevation of the indicator plate.

1 is the cap fitted to the upper end of the protruding filling neck 2 of the reservoir 3 of a radiator, not further shown, save for the ornamental border shell 4, all as usual in automobile radiators.

Within the reservoir 3 is a float 5 which has a range of movement between the bottom and top of the reservoir, and is conveniently shaped to lie substantially flat against the walls thereof, as is indicated in Fig. 2.

The float 5 is carried upon the lower end or bight of a swinging yoke 6, the arms of which are spaced sufficiently to avoid interference with any other member lying within the reservoir, as, for example, the bulb of a thermometer.

The upper ends 7 of the yoke are bent in opposite directions and pass outwardly in front and back, respectively, through the filling neck 2 above the shell 4 and below the cap 1. These ends 7 form shafts or gudgeons pivotally supporting the yoke, enabling it to swing under the rise and fall of the float, due to the varying water level. The rotation of the shaft ends 7 is taken advantage of to operate an indicator of any suitable nature which is carried upon their exterior portions and is visible from the outside. The indicator here shown consists of a sector shaped plate 8, the face of which carries differential indicia, as, for example, a color distinction, such as a red zone 8$^a$ and a white zone 8$^b$, Fig. 4.

The shaft ends 7 are effectively journaled, and the indicator 8 properly housed, as shown in Fig. 3, by means of a flanged bushing 9 screwed into the neck wall, and a housing shell comprising a body section 10 and a cover section 11, the body section being clamped against said wall by the bushing 9 with an intervening gasket 12, and the cover section being fastened to the body section by a screw 13.

The cover section 11 has a sight aperture 11$^a$ behind which is a window pane 14 clamped between the two sections, the whole assemblage being such as to form a protected indicator chamber, the rear one of which may lie close to the cap, as here shown, or, as is obvious, may be placed nearer the observer by simply extending the shaft end of the yoke to greater length.

I claim:—

In combination with a radiator reservoir having a filling neck, and a cap fitted to said neck, a device for indicating the level of the liquid in said reservoir including a yoke depending within the reservoir, the free ends of the arms of said yoke being bent in opposite directions and journaled respectively in the front and rear walls of the reservoir neck below the cap; a housing shell into which each of said journalled ends of the yoke arms project, said shell having a sight aperture; a flanged bushing fitted to the reservoir neck and in which the yoke ends are journaled, said bushing clamping the housing shell to the reservoir neck; an indicator carried upon the yoke ends within the housing shell, visible through the sight aperture thereof; and a float within the reservoir, carried by the yoke.

In testimony whereof I have signed my name to this specification.

JOHN J. WILT.